(No Model.) 2 Sheets—Sheet 1.

J. S. PATTEN.
SHUTTER WORKER.

No. 568,544. Patented Sept. 29, 1896.

WITNESSES:
Jos. A. Ryan
Amos W. Hart

INVENTOR
James S. Patten.
BY Munn & Co.
ATTORNEYS.

THE NORRIS PETERS CO., PHOTO-LITHO., WASHINGTON, D. C.

(No Model.) 2 Sheets—Sheet 2.
J. S. PATTEN.
SHUTTER WORKER.
No. 568,544. Patented Sept. 29, 1896.
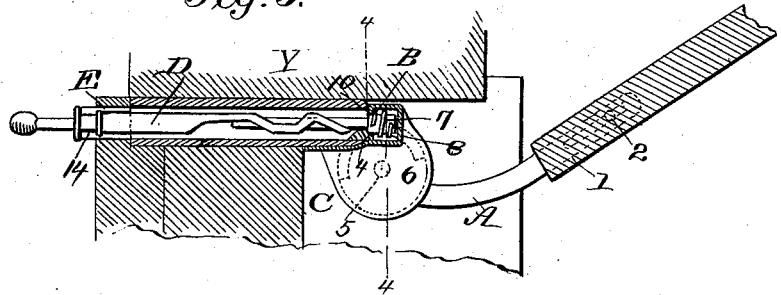
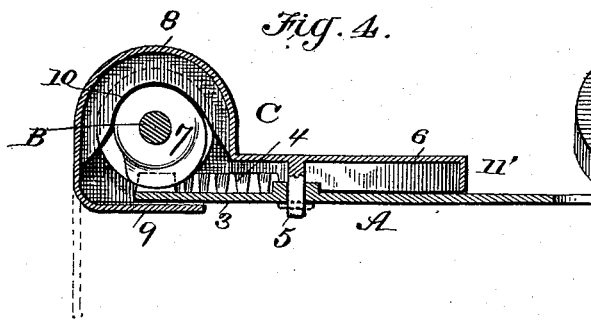
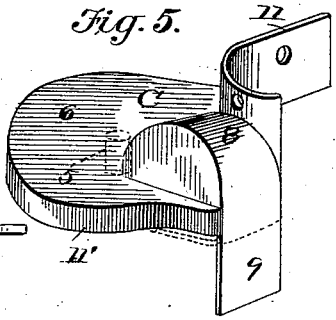
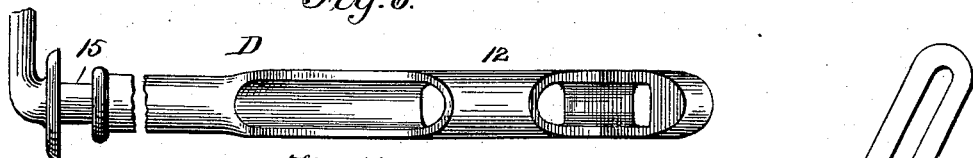
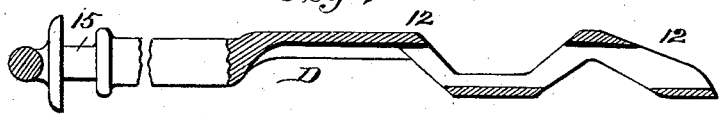
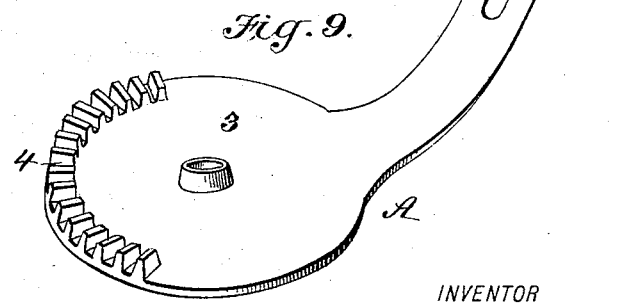
WITNESSES:
Jos. A. Ryan
Amos W. Hart
INVENTOR
James S. Patten
BY Munn & Co.
ATTORNEYS.

UNITED STATES PATENT OFFICE.

JAMES S. PATTEN, OF BALTIMORE, MARYLAND.

SHUTTER-WORKER.

SPECIFICATION forming part of Letters Patent No. 568,544, dated September 29, 1896.

Application filed November 5, 1895. Serial No. 568,052. (No model.)

*To all whom it may concern:*

Be it known that I, JAMES S. PATTEN, of Baltimore city, in the State of Maryland, have invented a new and useful Improved Shutter-Worker, of which the following is a specification.

My invention is an improvement in the class of shutter-workers which can be operated from the inside of the casing and are adapted to automatically lock the shutters open or closed or in any intermediate position. The several novel features of the same will be hereinafter pointed out.

Figure 1:
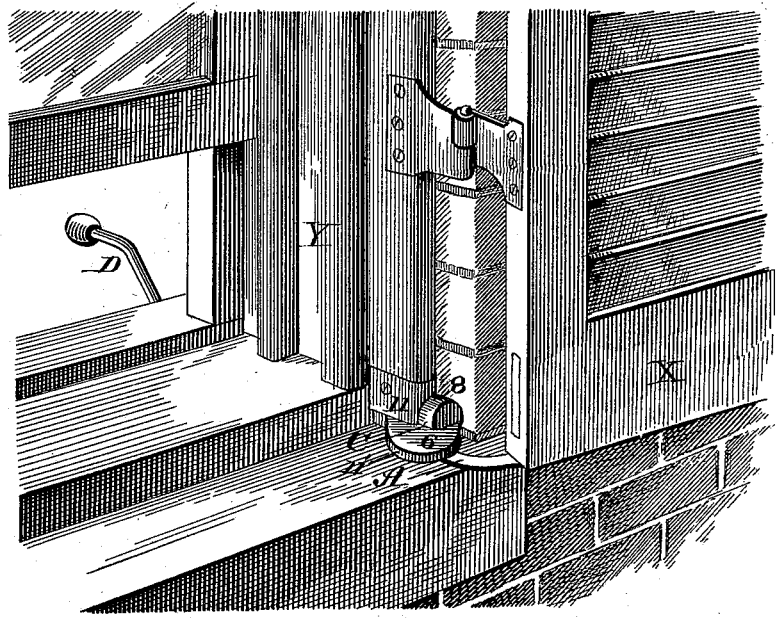
Figure 2:
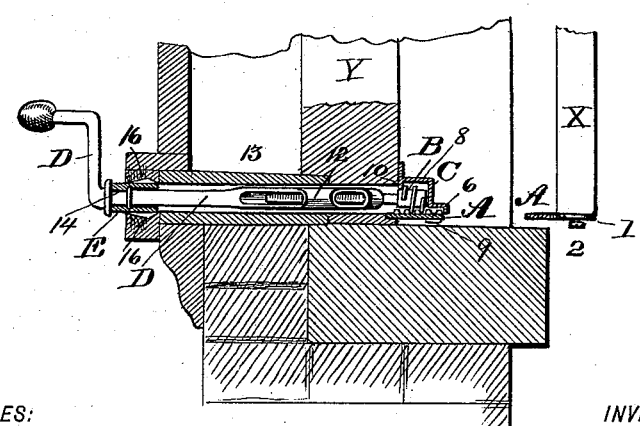

In the accompanying drawings, two sheets, Figure 1 is a perspective view illustrating my improved shutter-worker as applied in use. Fig. 2 is a vertical cross-section of the invention as shown in Fig. 1. Fig. 3 is a horizontal section of the same. Fig. 4 is a cross-section on line 4 4 of Fig. 3. Fig. 5 is a perspective view of the gear housing or frame. Figs. 6 and 7 are enlarged views of the rotatable handle or turning-key for operating the shutter-worker. Fig. 8 is an enlarged perspective view of the removable bearing of the rotatable handle or turning-key. Fig. 9 is an enlarged perspective view of the gear-lever which is connected with the shutter or blind.

As will be seen by reference to Figs. 1, 2, and 3, my invention includes a geared shutter-lever A, a worm-shaft B, a housing C for said parts A B, a rotatable handle or turning-key D for the worm-shaft, and a bearing E for the said turning-key. The said lever A, Fig. 9, has a slotted arm 1, by means of which it is connected with a screw 2, Fig. 2, set in the lower end of the shutter X. The circular disk-like head 3 of said lever is provided with gear-teeth 4 on its upper side, at a point opposite the arm 1, and is pivoted centrally, Figs. 3 and 4, on a headless pin 5, which is pendent from and formed integrally with the flat portion 6 of the housing C. The latter is screwed to the outer side of the window-casing Y, Figs. 1 and 2. The teeth 4 of said lever A mesh with the worm proper, 7, which is inclosed by the raised or semicylindrical portion 8 of the housing C. The polygonal shaft or shank of the worm is engaged, Figs. 2 and 3, by the socketed handle or turning-key D, Figs. 6 and 7, and it will be readily perceived that upon rotating the latter, D, the worm 7 will also be rotated and the lever A turned on its pivot 5, thus swinging the shutter X for opening or closing it either completely or partly. It will be further apparent that the worm 7 will lock the lever A at any point in its rotary movement, and thus the shutter X is held fixed in any position to which it may be turned or adjusted.

The several parts of my shutter-worker are preferably formed of cast metal and so constructed that they may be readily drawn from the sand mold. This is obviously so as regards the gear-lever A. The housing C is formed of malleable cast-iron and has a bent flange 9 and a central pivot-pin 5 for the horizontal lever A. In order that these parts 9 and 5 may not interfere with drawing from the mold, the flange 9 is cast pendent and parallel with the side of the housing, as shown by dotted lines, Fig. 4, and the pin 5 is also cast headless, as similarly indicated.

When the lever A has been placed on the pivot 5, the flange 9 is bent up into the position shown by full lines, Fig. 4, and thus serves to confine the head 3 of said lever in the housing C. The head of the pin 5 may be upset, if desired, as shown by dotted lines, Fig. 4; but this is not at all necessary.

The semicylindrical portion 8 of the housing C is provided interiorly with a narrow curved web or partition 10, Fig. 4, which is provided with a notch or open slot to receive the shaft B, and whose function is to assist in holding the worm 7 in the housing. That is to say, when the geared lever-head 3 is in place and the housing-flange 9 bent up against its under side the worm is held up in the portion 8 of said housing and prevented from longitudinal movement by the web 10, which is contiguous to or in frictional contact with its end. The said web 10, being parallel to the sides of the housing, will obviously permit withdrawal of the latter from the mold. The same is true of the curved horizontal flange 11, Fig. 5, which projects vertically upward and is provided with holes to permit its attachment (Fig. 1) to a rounded bead on the outer side of the window casing or frame. The bead is recessed to receive the flange 11, so that it is flush therewith. The outer or circumferential flange 11' of the housing, which extends down to the lever A, protects the toothed head of the latter. The vertical arrangement of this flange 11', like the parts 5, 10, and 11, facilitates withdrawal from the mold. The housing is thus so constructed as to adapt it to be manufactured at minimum cost.

The cast-metal rotary crank-handle or turning-key D, Figs. 6 and 7, is also constructed with special reference to easy withdrawal from the mold, the socket portion 12 thereof, which receives the shank of the worm B, being made skeleton-like by reason of portions being cut out at opposite points, as shown. In other words, every semicircular portion of the side of the socket 12 is opposite an open space on the other side of said socket. If the socket were a complete cylinder, it could not be cast of the length desired for window casings or frames of unusual width, since it is impracticable for it to make its own core.

It will be seen that the body of the turning-key lies in a tube 13, inserted in a bore in the window-frame. It is held in place, *i. e.*, against accidental longitudinal movement, by a two-part, hollow, cylindrical bearing E, Figs. 2 and 8. That is to say, the latter is formed of longitudinal halves and each is provided interiorly with a narrow flange 14, which enters a circumferential groove 15, Fig. 6, in the shank of the turning-key D. This cylindrical bearing E being first applied to the key D, they are inserted in place simultaneously, the bearing being forced or driven into the bore in the window-frame, so as to be held thereon by friction. As a means of absolute security against accidental withdrawal of the bearing E, I provide the back of each of its halves with a thin lengthwise rib 16, whose edge has the form of an obtuse angle and whose sides are parallel. In other words, it is beveled at each end, and also parallel-sided, for the purpose of enabling it to be driven with comparative ease or to be extracted without tearing the wood to an appreciable degree. When once inserted in the wood, the elasticity of the latter causes it to close on the ribs 16 and hold the bearing firmly, yet permitting its withdrawal by the application of due force. It will be noted that the angle of the ribs 16 is nearest the inner end of the bearing E, so that but partial insertion of the latter in the wood will enable the ribs to hold with due tenacity. The said bearing serves as an adjustable support for the handle D, whereby it accommodates the latter to beadings of varying thickness.

In place of the turning-key B being provided with a crank-arm or handle, as shown, a knob or cross-handle may obviously be employed.

In addition to functions and advantages heretofore noted it will be seen that the invention is characterized by the utmost simplicity as to attachment to and detachment from the window-casing, since it is only necessary to bore a hole through the sill from the inside and set and secure the housing in place and insert the handle and accessories. Further, when it is desired to detach the blind for painting or other purpose it may be effected by first removing the screw 2 in the bottom of the same, when the blind may be lifted off its hinges; yet when the blind is closed burglars cannot obtain access to the screws that attach the housing to the head of the casing Y. The housing likewise protects the gearing from snow, rain, paint, or other foreign substances.

Having thus described my invention, what I claim, and desire to secure by Letters Patent, is—

1. The housing, or frame, for a shutter-worker, having a flange 9, which is pendent, as specified, and adapted to be bent up into horizontal position for holding the gearing in place.

2. The housing, or frame, for the gearing of a shutter-worker, the same comprising a body having a flange which is cast pendent and adapted to be subsequently bent up as specified, and a headless pivot-pin which is also pendent, as shown and described.

3. The combination, with the metal housing, having a pendent side, or circumferential, flange, and a pendent, internal web, or partition, which has a notch in its lower edge and is parallel to such flange, whereby a recess or compartment is formed between them, of a gear, or worm, arranged, and held from displacement by endwise movement, in such compartment, the shaft which traverses the latter and carries the worm, and the geared lever that meshes with the worm, as shown and described.

4. The improved housing, or frame, for inclosing and supporting the gearing of a shutter-worker, which comprises the body, C, having an extended flat portion, provided with the pendent pivot-pin, the semicylindrical portion, having a pendent internal web, or partition, a pendent flange 9, which is intended to be subsequently bent up to support the gearing, and the upward-projecting flange 11, provided with screw-holes as shown and described.

5. The combination, of the geared shutter-lever and worm, with the housing having a vertical pendent pin on which said lever is journaled, the housing having the lateral flexible flange, or lip, 9, which, when bent upward into horizontal position, works in contact with such geared lever and supports it, as shown and described.

6. The combination of the geared shutter-lever and the worm engaging it, the housing provided with a pendent pivot-pin, and an elevated portion forming a chamber or recess, having at one end an internal web, or partition 10, having a notch in its free under side, as shown, whereby it accommodates the worm-shaft and prevents the worm proper from an endwise movement, and the flexible flange, or lip, 9, projecting from the side of the housing, and bearing against the lever-head, and thereby supporting it and the worm, all arranged as shown and described.

JAMES S. PATTEN.

Witnesses:
THOS. C. BAILEY,
MORTON SCHAEFFER.